June 16, 1942.  E. F. HUDDLE  2,286,278
SELF LOADER
Filed July 10, 1940  2 Sheets-Sheet 2
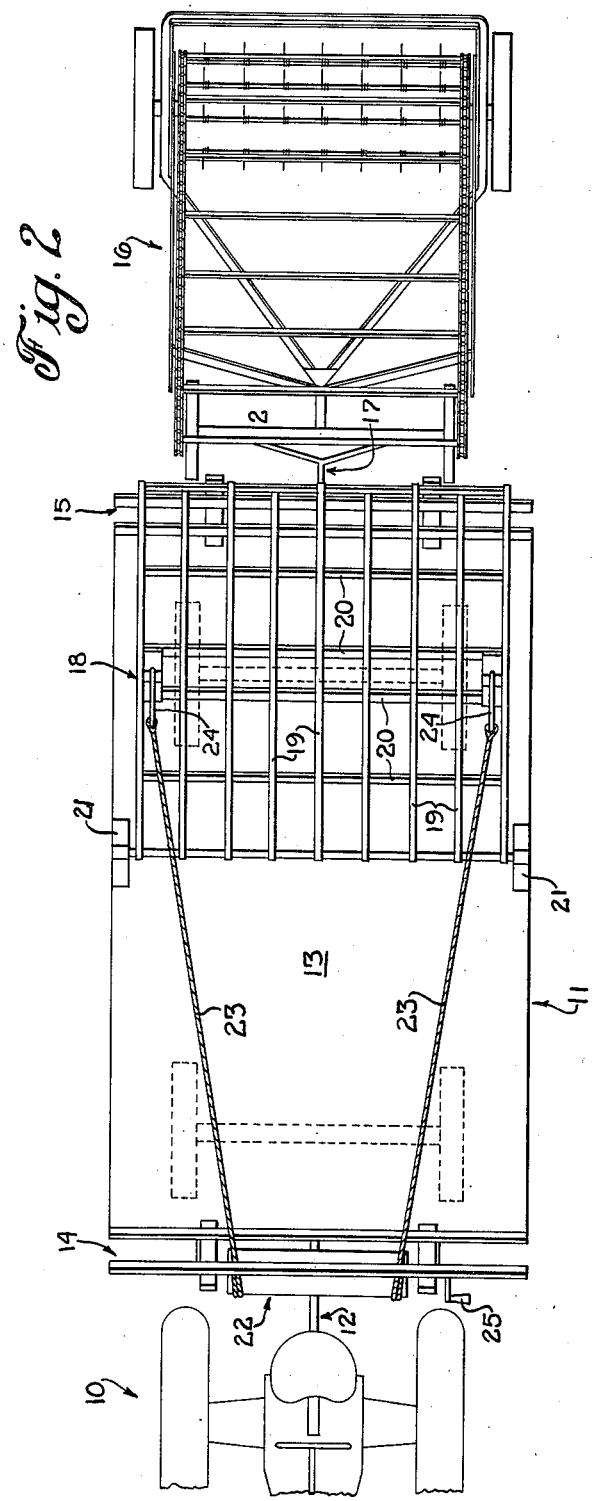
Inventor
EDWIN F. HUDDLE
By Paul C. Pippel
Att'y.

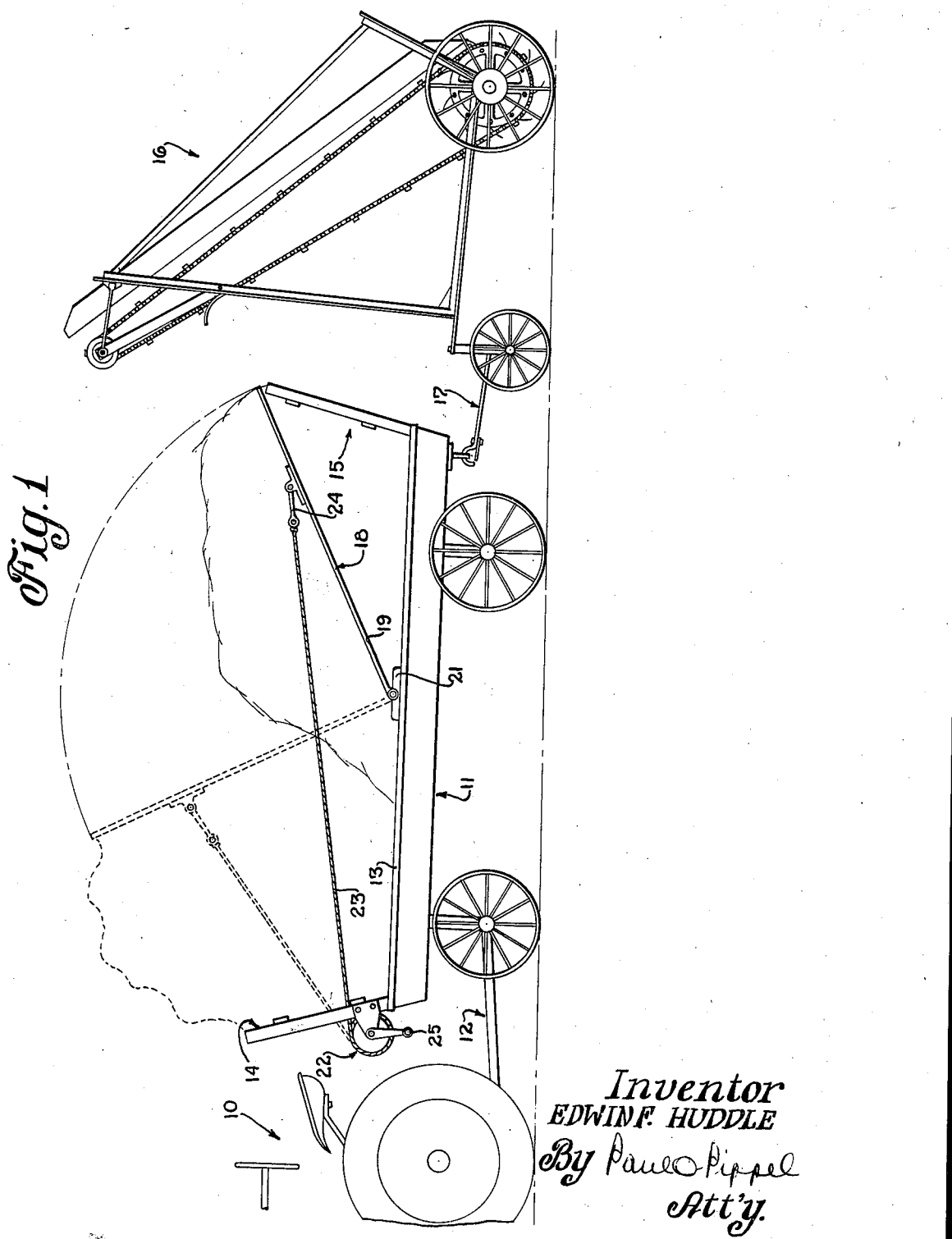

Patented June 16, 1942

2,286,278

UNITED STATES PATENT OFFICE 2,286,278

SELF-LOADER

Edwin F. Huddle, Chicago, Ill., assignor to International Harvester Company, a corporation of New Jersey Application July 10, 1940, Serial No. 344,752

3 Claims. (Cl. 214—77)

The present invention relates to a self-loader. More specifically the invention relates to a novel means which will permit a loading device to evenly distribute material onto a wagon.

When picking up cut material, such as hay, from the ground and loading it onto a wagon or hay rack, it is desirable to evenly distribute the material about the wagon. Normally, the material must be distributed about the wagon by hand. This method is not satisfactory, since the material is trampled.

It is, therefore, an object of the present invention to provide a self-loading means for a wagon.

Another object is to provide a wagon with a self-loading means which may be controlled by the operator on a tractor adapted to pull the wagon.

Other objects and advantages of the present invention will become apparent to those skilled in the art when taken in conjunction with the accompanying drawings, in which:

Figure 1 is a side view of the novel self-loader mounted on a wagon; and,

Figure 2 is a plan view of the structure shown in Figure 1.

Referring to Figure 1, a conventional type tractor 10 has connected thereto a wheeled implement or wagon 11 by a suitable hitch connection 12. The wagon 11 consists of a bed portion 13, and front and rear upwardly extending portions 14 and 15. A conventional, wheeled, material-elevating device or loader 16 of the type shown in the patent to E. Mowry, No. 1,467,392, issued September 11, 1923, is connected to the rear of the wagon 11 by a suitable hitch 17.

On the bed 13 of the wagon 11 is pivotally connected a partition 18 which may be of any suitable construction, but which in the present case consists of a plurality of longitudinally arranged members 19. The partition 18 extends the entire width of the bed 13, as shown in Figure 2. A plurality of members 20 are arranged transversely of the longitudinally disposed members 19 and secured thereto in any desirable manner. One end of the partition 18 is pivotally connected to the wagon bed 13 and intermediate the ends thereof by means of the parts 21 which are secured to the bed 13.

The partition 18 is adjusted about its pivotal connection to the wagon bed 13 by means of a windlass 22 which is mounted on the front upwardly extending portion 14. A pair of ropes or cables 23 extend from the windlass and are connected to the links 24 provided on opposite sides of the partition 18. The windlass 22 is controlled by a crank 25 which, as shown in Figure 1, is within reach of the operator on the tractor. The control means for the partition 18 could be provided on the tractor and operated by power from the tractor.

When cut material is being picked up from the ground, the tractor, wagon, and material-elevating device are trailed one behind the other, as shown in Figure 2. The partition 18 extends angularly upwardly toward the rear, upwardly extending portion 15. The material-elevating device 16 picks up the material and conveys it onto the partition 18 from which it moves toward the front of the wagon bed 13. When a sufficient amount of material is deposited on the partition 18, the operator on the tractor 10 may turn the crank 25 of the windlass 22 and move the partition over into the position shown in dotted lines in Figure 1. The cables 23 hold the material from falling off the side of the wagon 11, and the partition 18 and the front upwardly extending portion 14 hold the material at the front of the wagon. The material-elevating device may now convey material onto the rear of the wagon.

From the foregoing description it is apparent that a novel and economical to manufacture self-loader has been provided for a wagon. The pivotally mounted hinged partition may be moved by the operator on the tractor when desired, and the trampling of the material is eliminated.

The term "wagon" herein used is intended broadly to include any type of vehicle supported on wheels or wheel substitutes.

It is the intention to limit the invention only within the spirit and scope of the appended claims.

What is claimed is:

1. A self-loader for a wagon comprising a partition pivotally mounted on the wagon and extending upwardly and rearwardly thereof, and means mounted on the wagon and connected to opposite sides of the partition for adjusting the partition about its pivotal connection to an upwardly and forwardly extending position.

2. In combination, a wagon, a partition pivotally mounted transversely on the wagon and extending upwardly and rearwardly thereof, and manual means mounted on the wagon and connected to opposite sides of the partition for moving the partition about its pivotal connection to the wagon.

3. In combination, a wagon, a partition pivotally mounted transversely on the wagon and extending upwardly and rearwardly thereof, a windlass mounted on the wagon, and cables extending from the windlass and connected to opposite sides of the partition for adjusting the partition about its pivotal connection to the wagon to a position upwardly and forwardly of its pivot.

EDWIN F. HUDDLE.